United States Patent

[11] 3,599,382

| [72] | Inventor | Wayne B. Stone, Jr.<br>5115 Flanders Ave., Kensington, Md. 20795 |
|---|---|---|
| [21] | Appl. No. | 869,959 |
| [22] | Filed | Oct. 27, 1969 |
| [45] | Patented | Aug. 17, 1971<br>Continuation of application Ser. No. 730,426, May 20, 1968, now abandoned. |

[54] AUTOMOTIVE SUPPORT STRUCTURE
7 Claims, 13 Drawing Figs.

[52] U.S. Cl. .................................... 52/175, 14/71, 214/16.1
[51] Int. Cl. ..................................... B65g 11/18, E04h 6/38
[50] Field of Search ........................ 52/174, 64, 175; 105/368; 14/71, 72; 214/16.1; 182/1

[56] References Cited
UNITED STATES PATENTS

| 2,959,262 | 11/1960 | Parker | 105/368 |
| 2,963,991 | 12/1960 | Schueder | 105/368 |
| 3,081,715 | 3/1963 | Moorhead | 105/368 |

Primary Examiner—John E. Murtagh
Attorney—Wayne B. Stone

ABSTRACT: The disclosure relates to an automotive support structure including a pair of ramps over which an automobile may be driven from a lower level to an elevated parking location. The ramps are mounted for pivotal movement in a common vertical plane between a first position defining an inclined path of wheel travel from the lower level to the elevated parking location and a second position in which the ramps are vertically spaced a distance sufficient to permit an automobile to be driven over one of the ramps and beneath the other of the ramps.

The ramps are interconnected in such a manner that each of the ramps acts to counterbalance the other ramp so that a prime mover is not required to selectively position the ramps.

INVENTOR
WAYNE B. STONE, JR.

INVENTOR
WAYNE B. STONE, JR.

BY

ATTORNEY

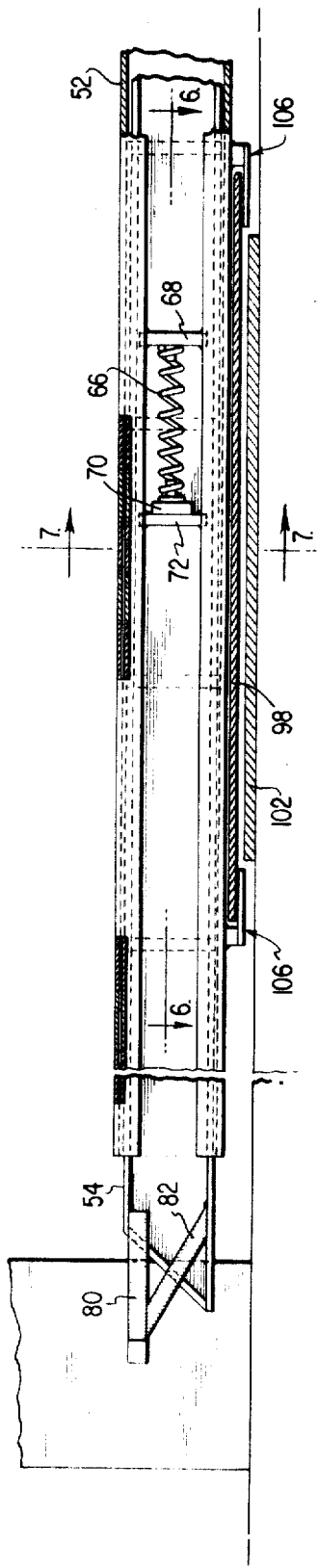
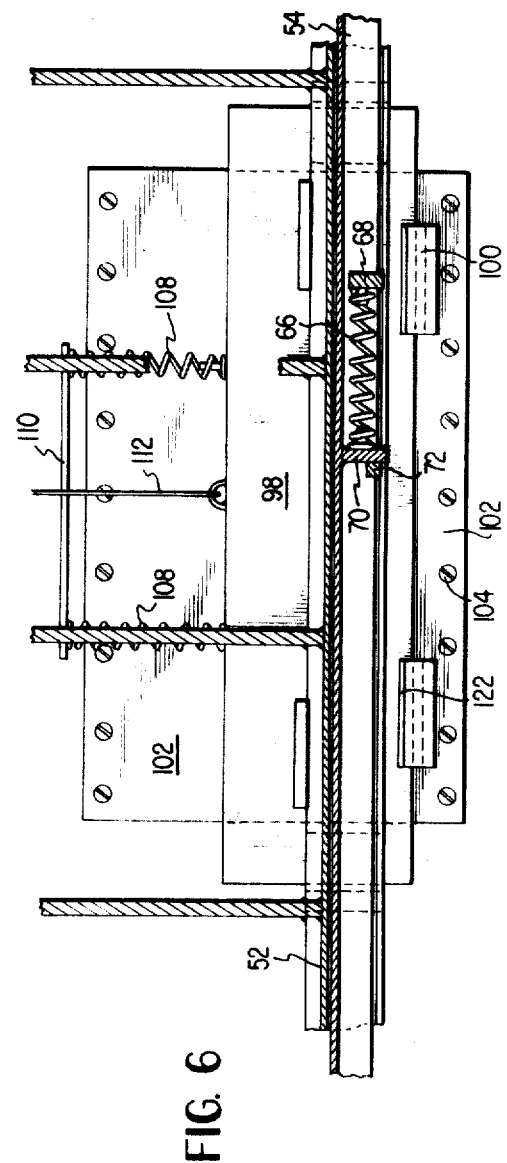
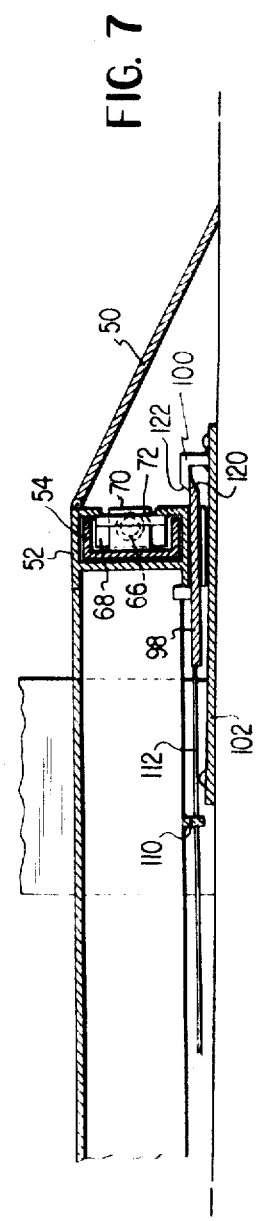
FIG. 5
FIG. 6
FIG. 7
INVENTOR
WAYNE B. STONE, JR.
BY
ATTORNEY

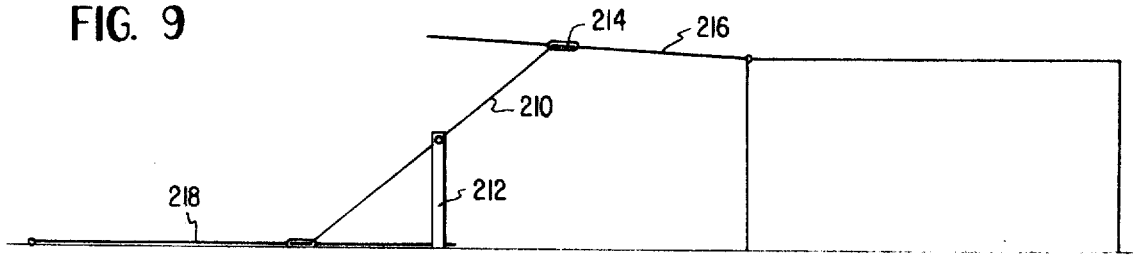
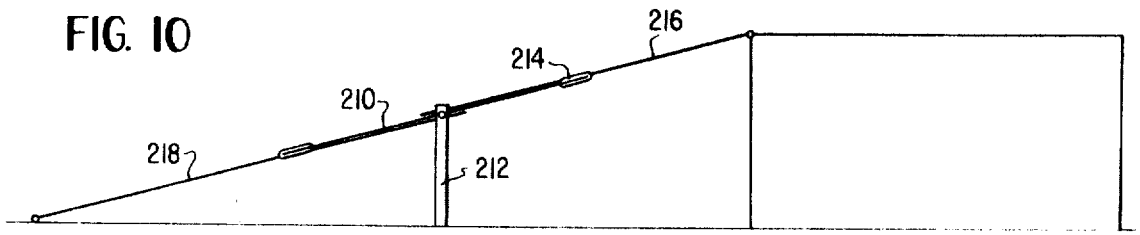
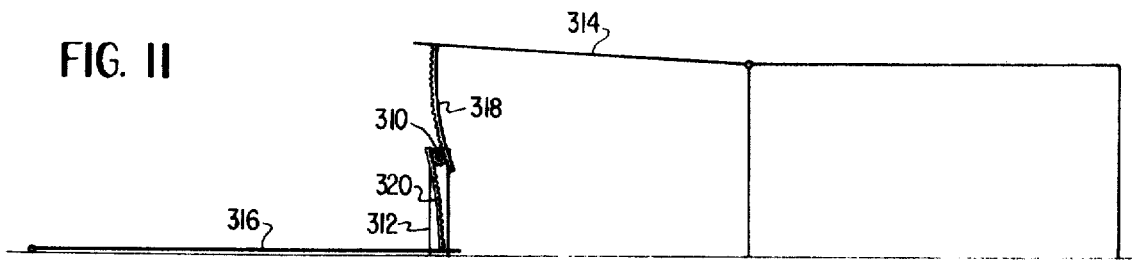
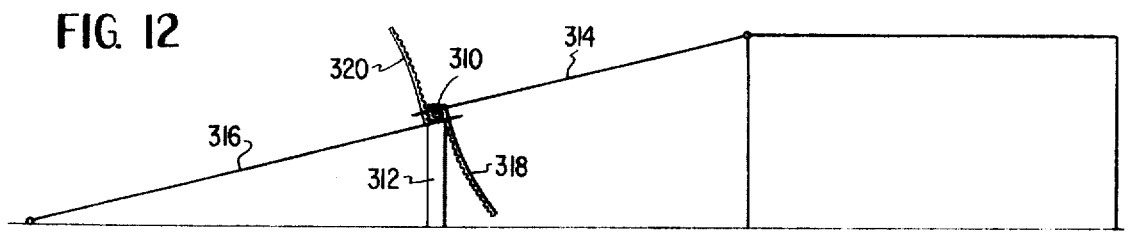
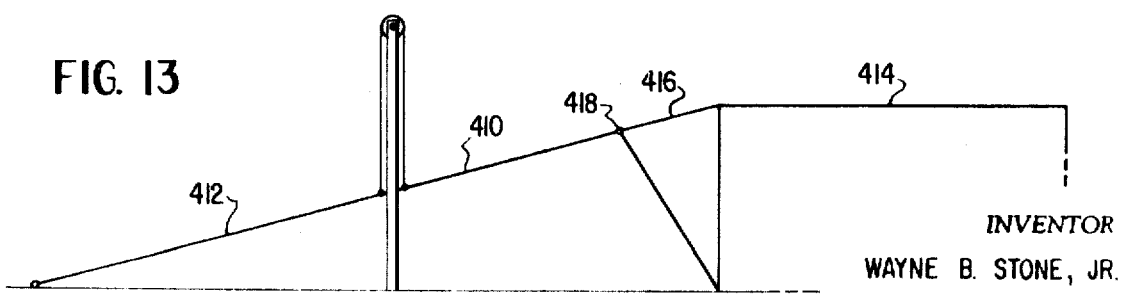

3,599,382

1

AUTOMOTIVE SUPPORT STRUCTURE

This application is a continuation of application Ser. No. 730,426, now abandoned.

BACKGROUND OF THE INVENTION

There are many areas of business such as parking lots, service stations, car rental facilities and automobile dealership agencies where it necessary to park or store automobiles for varying periods of time and in which the space available for this purpose is limited.

Prior attempts to increase the parking capacity of a given area have, in general, involved the use of parking buildings which require a large capital outlay and may not be feasible for small businesses or other operations where the construction of a building is not practicable.

The state of the prior art regarding previous attempts to produce single-unit automotive support structures is set out in copending application, Ser. No. 628,491 filed Apr. 4, 1967, now U.S. Pat. Nos. 3,440,782, and 681,771 filed Nov. 9, 1967, now Pat. No. 3,416,269.

SUMMARY OF THE INVENTION

It is an object of this invention to provide a support structure having an elevated parking level upon which an automobile may be driven under its own power while preserving the original parking areas, on which the support structure is positioned, for the parking of additional automobiles.

The foregoing and other objects of the invention are achieved by pivotally mounting two ramps adjacent an upper and lower parking level, respectively. The two ramps are interconnected for conjoint counterpivotal movement in such a manner that each ramp serves as a counterbalance for the other.

The ramps have two extreme positions of movement. In the first position the free ends of the ramps are immediately adjacent each other and, together, the ramps define an inclined path of automotive wheel travel between the upper and lower parking levels. In the other extreme position of movement, the free ends of the ramps are vertically spaced a distance exceeding the height of an automobile. In the latter position, the lower ramp lies substantially flat on the lower level and the upper ramp is raised to form a substantial continuation of the upper parking level. When the ramps are in this latter position, an automobile may be driven across the lower ramp to reach a parking position directly beneath another automobile that had previously been driven onto the upper level.

DESCRIPTION OF THE DRAWINGS

FIG. 5 is a broken, fragmentary sectional view of the forward end of the lower ramp, taken along line 5-5 of FIG. 2;

FIG. 6 is a sectional view taken along line 6-6 of FIG. 5;

FIG. 7 is a cross-sectional view taken along line 7-7 of FIG. 5;

FIG. 8 is a detail sectional view of the lower end of a lower ramp taken on the line 8-8 of FIG. 1;

FIG. 9 is a diagrammatic illustration of a second form of the invention showing the ramps in an extreme position;

FIG. 10 is a view similar to FIG. 9 illustrating the ramps in their other extreme position;

FIG. 11 is a diagrammatic illustration of a third embodiment showing the ramps in the open position;

FIG. 12 is a view similar to FIG. 11 illustrating the ramps in the inclined position; and FIG. 13 is a diagrammatic illustration of a fourth embodiment quite similar to that illustrated in FIG. 1.

DESCRIPTION OF THE PREFERRED EMBODIMENT

Figure 1:
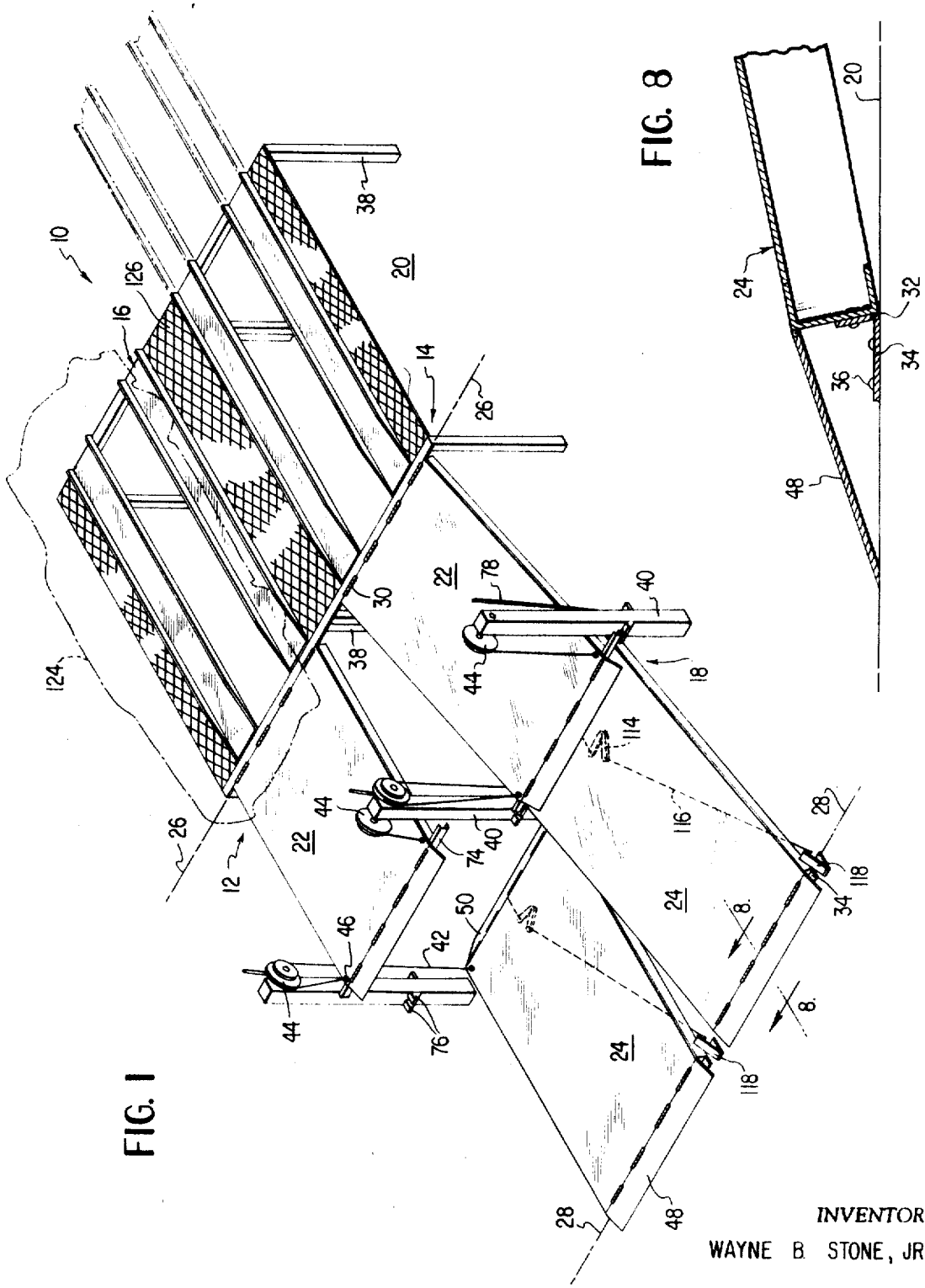
FIG. 1 is a perspective view of an automotive support structure constructed in accordance with the present invention depicting two units whose associated ramps are illustrated in extreme positions of movement.

A first embodiment of the automotive support structure 10, illustrated in FIG. 1, includes two support units 12 and 14 each of which includes an upper parking level 16 onto which an automobile may be driven over ramp assembly 18 from lower parking level 20.

Ramp assemblies 18, each, include upper and lower ramps 22, 24 mounted for pivotal movement, in common vertical planes, about pivot axes 26, 28 defined by pivots 30, 32 supported adjacent the upper and lower levels, respectively. The upper pivots are preferably supported on the upper level framing structure and the lower pivots may, desirably, be provided on a plate 34 suitably secured to the lower level by stakes 36 or the like.

Upstanding legs 38, supporting upper level 16, are transversely spaced a distance exceeding the width of an automobile and define a path of automotive movement therebetween for an automobile to reach a parking position, on lower level 20, directly beneath an automobile parked on upper level 16.

As will be apparent from an inspection of the two extreme positions of ramp assemblies 18, shown in FIG. 1, the lengths of ramps 22, 24 and the relative positions of the pivot axes 26, 28 are so selected that the free ends of the ramps come into juxtaposition to provide an inclined path of automotive wheel travel, between the upper and lower levels, when the ramps are in the inclined position illustrated in the case of support unit 14.

Positioned one on either side of each ramp assembly 18, adjacent the free ends of the ramps, are a pair of upstanding support posts 40 defining therebetween a continuation of the path of automotive movement extending between the transversely spaced legs 38. Support posts 40 may be integrated with the remainder of the structure, so that there is no necessity of affixing the same to lower level 20, such as by interconnecting the legs 38, support posts 40 and plate 34 by rigid elements. Alternatively support posts 40 may be secured to the lower level as by being set in concrete or the like.

The purpose of support posts 40 is twofold; to provide a static support on which the support ramps 22, 24 may rest in the inclined position to support an automobile being driven thereover, and to provide a support for force transmitting means interconnecting ramps 22, 24.

The force transmitting means depicted in the embodiment shown in FIGS. 1—8 includes flexible elements, such as cables 42, reeved over idle pulleys 44 supported on posts 40. The opposite ends of the cables are secured to the free ends of the ramps by eyelets 46 or the like. It will be apparent that with this arrangement, ramps 22, 24 are counterbalanced against each other and constrained for counterrotative pivotal movement about their respective pivot axes 26, 28.

Although cable 42, in the embodiment of FIG. 1, engages only one of the grooved rims shown on each pulley 44; a smaller rim is shown in the drawing to illustrate the manner in which a greater degree of movement might be imparted to one or the other of the ramps. In such event, the cables anchored to one of the ramps would be anchored to the same size rim on the two adjacent pulleys while the cable anchored to the other of the ramps would be anchored to the other of the pulley rims. When modifying the cable arrangement in this manner, due consideration must be given to the different weight ramps to be employed.

When ramps 22, 24 are in the extreme position, illustrated by the ramps associated with unit 12 in FIG. 1, the free ends of the ramps are vertically spaced a distance exceeding the height of an automobile and it is apparent that an automobile may be driven across the lower ramp 24, lying on the lower level, to reach the parking space on the lower level 20 directly beneath an automobile parked on upper level 16. Pivoted flap plates 48, 50 are hinged at opposite ends of lower ramp 24 to provide a smooth transition between the ramp and lower level when the ramps are in the open position. Suitable stops, not shown, limit the pivotal movement of flap plates 48, 50 to the extreme positions illustrated in the drawings.

In the particular form of the invention selected for illustration in connection with FIGS. 1—8; the torque applied to cables 42 by upper ramp 22 exceeds that exerted by the lower ramp, by a slight amount, so that in the absence of any external forces the ramps will assume the inclined position illustrated in connection with support unit 14 shown in FIG. 1.

The differential in forces applied to the ends of the cables are so selected, by calculation of the lengths and weights of the ramps, that the weight of a person standing adjacent the free end of the lower ramp will upset the counterbalancing bias toward the inclined ramp position and result in the ramps opening to the position shown in connection with support unit 12.

In choosing the height of upper level 16 and the overall length of ramp assembly 18, due consideration must be given to the various angles involved after the manner set out, in great detail, in the aforesaid copending application, Ser. No. 628,491.

Inasmuch as ramp assembly 18 must be able to support the weight of an automobile in the inclined position and since, in the open position of the ramp assembly, the same is counterbalanced toward the inclined position; it is necessary to provide latching means to lock the ramp assembly in the two extreme positions shown in FIG. 1. Turning first to FIGS. 2—7 for a description of the manner in which the ramp assembly is supported and locking in the inclined position; the free end of lower ramp 24 is illustrated as having a forwardly facing channel section 52 within which section is slidably supported a locking bar 54 of suitable structural shape to support the weight of an automobile in the manner to be subsequently described.

Figure 3:
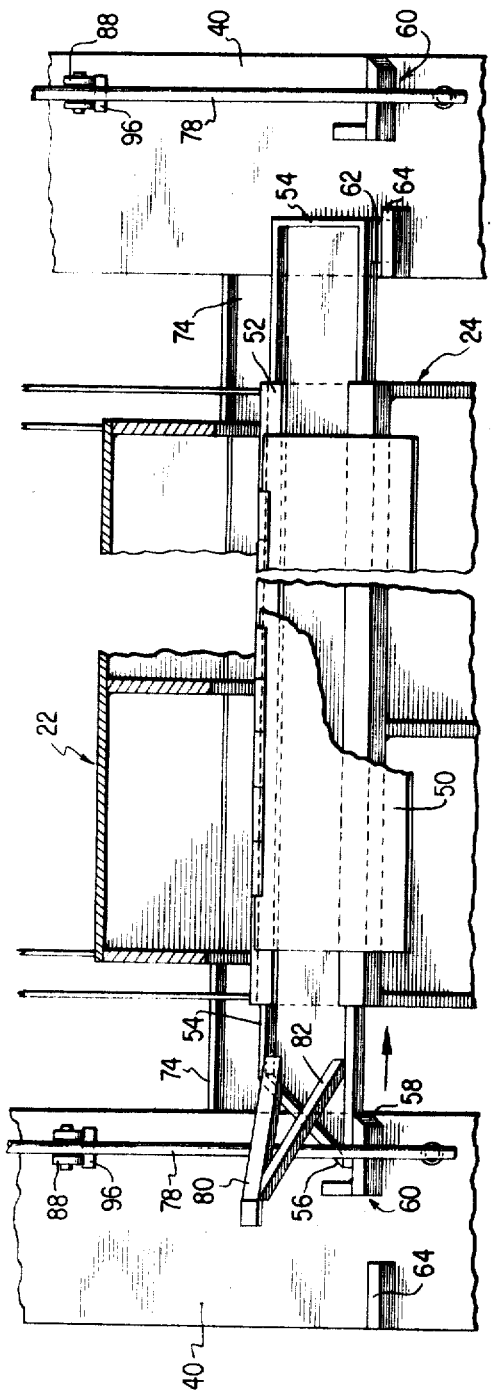
FIG. 3 is a broken sectional view taken along line 3-3 of FIG. 2.
Figure 4:
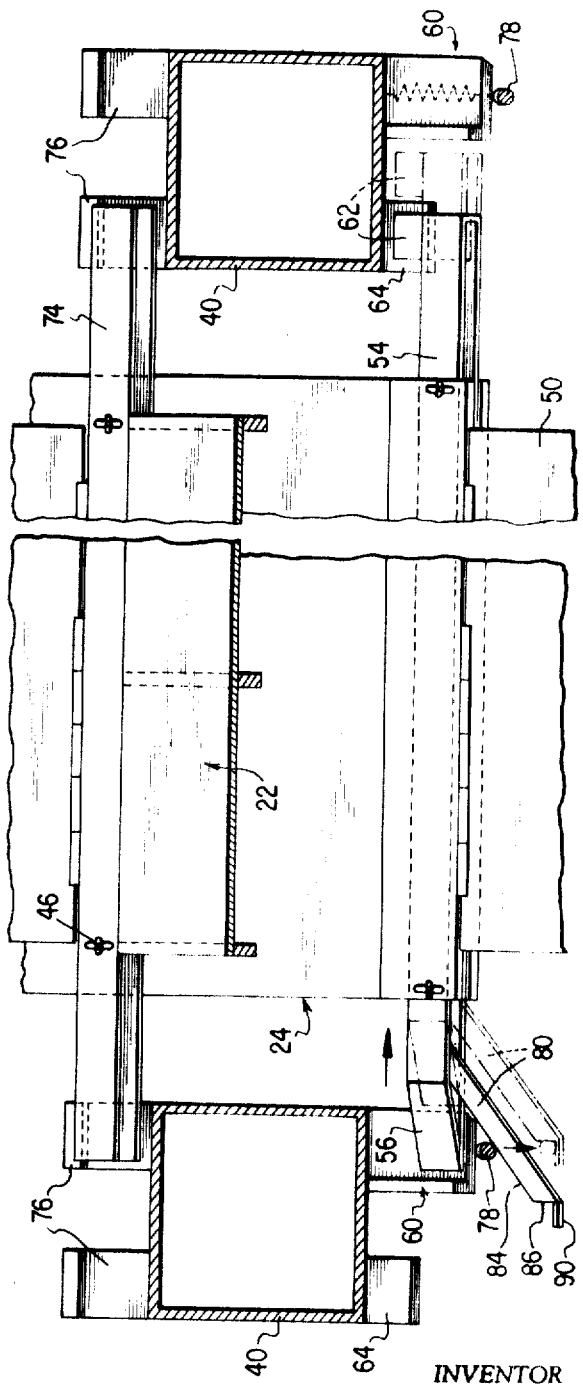
FIG. 4 is a broken sectional view taken along line 4-4 of FIG. 2.

The left-hand end of locking bar 54, as viewed in FIGS. 3—5, has an upwardly facing cam surface 56 that coacts with a downwardly facing cam surface 58 on a locking projection or lug 60 suitably affixed to the forwardly facing side of corresponding support post 40. The other end of bar 54 has welded thereto a locking lug 62 adapted to coact with a static lug 64 secured to the forwardly facing side of the other support post. A suitable compression spring 66 reacting between lugs 68 and 70 secured, respectively, to channel member 52 and locking bar 54 biases the locking bar to the left, as viewed in FIGS. 3—5. Locking bar 54 is limited in its leftward travel by engagement of lug 70 with stop 72 secured to channel 52. Accordingly, as lower ramp 24 approaches the extreme inclined position, cam surface 56 on locking bar 54 engages fixed cam surface 58 to cam the locking bar to the right whereupon lug 62, carried on the right-hand end of bar 54, is moved out of vertical alignment with static lug 64 as indicated by the phantom line position of FIG. 4. As the lower ramp reaches the extreme inclined position, bar 54 passes above cam surface 58, lug 62 passes above static lug 64 and spring 66 returns locking bar 54 to the left whereupon the free end of lower ramp 24 is supported through bar 54 on the upper surfaces of lugs 60 and 64.

Concurrently with the upward movement of lower ramp 24 to the inclined locked position, the free end of upper ramp 22 descends to its lower position immediately adjacent the free end of the lower ramp. The free end of the upper ramp has a rigid structural member 74 secured to the undersurface thereof with the ends of member 74 extending beyond the lateral confines of ramp 22 to engage fixed support lugs 76 welded or otherwise secured to the rearwardly facing surfaces of posts 40. It will be apparent that in the inclined position of the ramp assembly, the upper end of lower ramp 24 is supported on lugs 60 and 64 on the forward faces of posts 40 while the lower end of upper ramp 22 is supported on lugs 76 on the rearward faces of posts 40.

With the ramps locked in the inclined position, an operator drives an automobile up the ramp assembly to upper level 16, leaves the car and walks down the ramps. When the operator reaches the left-hand post 40, as viewed in FIGS. 3—5 (the right-hand post as viewed in FIG. 1), he actuates handle 78 to release locking bar 54 by camming the same to the right hand position indicated in phantom lines in FIG. 4. The release mechanism is so constructed that once the locking bar is withdrawn from the locking position, it remains in the unlocked phantom line position of FIG. 4 until after the free end of the lower ramp has pivoted downwardly below the level of lugs 60, 64 so that it is not necessary for the operator to hold the latch release handle until inertia is overcome and the lower ramp has started to pivot downwardly by virtue of the weight of the operator walking down the lower ramp.

Figure 2:
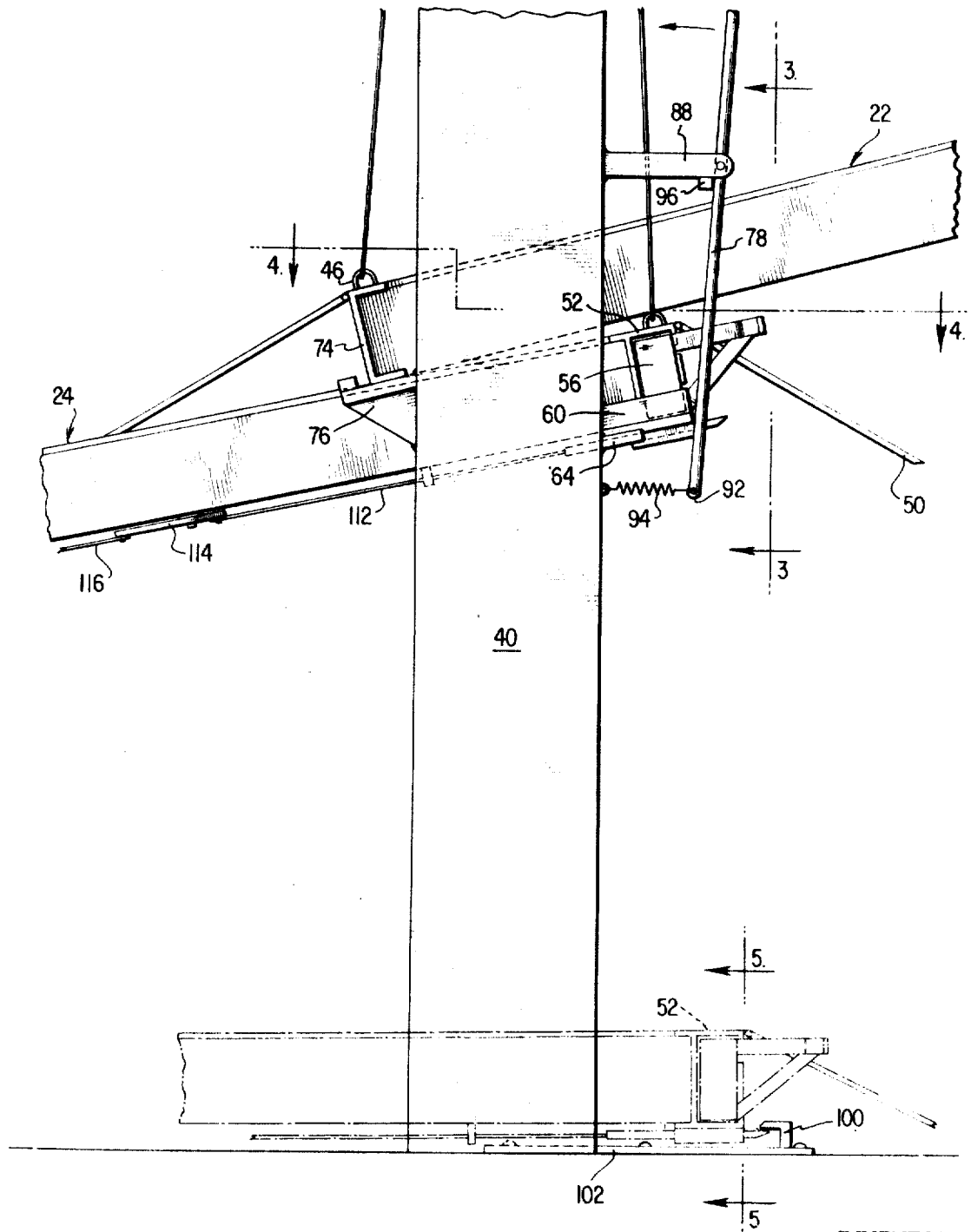
FIG. 2 is a fragmentary side elevational view of the free ends of the ramps and an associated support post.

The manner in which the lock release is effected and a time delay mechanism set in motion to hold the same released until the lower ramp has pivoted downwardly past the static support lugs 60, 64 will be more apparent from an inspection of FIGS. 2—4. Arm 80 is rigidly secured to locking bar 54 at approximately 45° to the axis thereof by welding or the like and a bracing strut 82 to provide a cam face 84 to coact with handle 78. The outer end of cam face 84 terminates in a flat surface 86 disposed perpendicularly to the axis of the locking bar and parallel to the direction of movement of handle 78. Handle 78 is pivotally mounted between ears 88 on the forward face of post 40 above the level of the locking bar. The lower portion of handle 78, in the extreme left or locked position of locking bar 54, is in position to engage cam face 84 of the locking bar as shown in FIGS. 3 and 4. When the operator grasps the upper end of handle 78 and moves the same rearwardly the lower portion of the handle, below the pivot fulcrum, moves forwardly into engagement with cam surface 84 to cam the lock bar to the right, or unlocked, position where the locking bar and its integral lug 62 are out of vertical alignment with lugs 60 and 64 on posts 40. As the lower portion of handle 78 is moved against cam surface 84 camming the same to the right, the handle comes to rest on flat surface 86 against stop 90 as shown in phantom lines in FIG. 4. This is the lock release position and since the handle engages flat surface 86 which is perpendicular to the axis of lock bar 54 and parallel to the direction of motion of handle 78, there is no force component tending to return handle 78 to the solid line position of FIG. 4. Accordingly, handle 78, when in the dotted line position of FIG. 4, retains lock bar 54 in the lock release position until the free end of lower ramp 24 has pivoted downwardly below the lower end 92 of handle 78 at which time spring 94 returns the handle to its original position against stop 96 and spring 66 restores lock bar 54 to the left-hand or locking position. Lock bar 54 is, then, again in position to be cammed to the right by the coaction of cam faces 56 and 58 when the free end of the lower ramp is again raised to the inclined position.

Lower ramp 24 is latched in the lower, or open, position by a latching plate 98 slidably mounted on the undersurface of the lower ramp for coaction with fixed lugs 100 carried on plate 102 that is suitably secured to lower level 20 by stakes 104 or the like. The manner in which latching plate 98 is mounted on ramp 24 is best illustrated in FIGS. 2 and 5—7. Brackets 106, suitably secured to the undersurface of ramp 24, loosely embrace the sides of plate 98 and mount the same for limited forward and rearward movement. Compression springs 108, reacting between a fixed bracket 110 secured to the undersurface of ramp 24 and the rear edge of latching plate 98, urge the plate toward the latched position of FIG. 2. A cable 112 is interconnected between the read edge of plate 98 and one arm of bellcrank 114 pivotally mounted on the undersurface of ramp 24. The other arm of the bellcrank is interconnected by a second cable 116 with a foot pedal 118, shown in FIG. 1. Cable 116 extends through cable supports, such as openings formed in the framing support of the lower ramp, between the generally centrally located bellcrank and the associated foot pedal positioned at one side of the ramp. It will be apparent that, as lower ramp 24 pivots downwardly to the phantom position of FIG. 2, downwardly facing cam surface 120 on latching plate 98 will engage upwardly facing cam surfaces 122 on lugs 100 to cam the plate rearwardly until the same passes below the cam surfaces 122 at which time springs 108 project the plate forwardly into the locked position shown in FIG. 7. Release of latching plate 98 is effected by depressing foot pedal 118 which pivots bellcrank 114 through cable 116 and tensions cable 112 to retract plate 98 against the bias of springs 108. Since upper ramp 22 imposes a greater torque on cables 42 than does the lower ramp, depression of foot pedal 118 results in the ramp automatically reassuming the inclined locked position.

Ramps 22 and 24 may be of all metal construction or they may include a rectangular metal frame whose sides are bridged by suitable wooden framing and covered with plywood or other sheeting material such as metal, fiberglass or the like. Because the ramps are counterbalanced against each other, the weight of the materials used in their construction is not critical even though all of the necessary ramp movements are designed to be performed manually. It is, of course, obvious that power means could be used in the practice of the invention and the counterbalancing feature would permit the use of much smaller prime movers than have heretofore been used in connection with elevated parking structures.

In operation, assuming the ramps to be in the open position illustrated by unit 12 in FIG. 1; an operator depresses foot pedal 118 to withdraw latching plate 98 from locking engagement with lugs 100. The ramps then automatically assume the locked inclined position of unit 14 in FIG. 1 because of the greater bias imparted to cables 42 by the upper ramp. As the free end of lower ramp 24 approaches the position of FIGS. 2—5, locking bar 54 is cammed to the right and passes above the level of lugs 60, 64 whereupon spring 66 restores the locking bar to the leftmost position and the left-hand end of bar 54 rests on lug 60 while lug 62 on the right-hand end of bar 54 rests on lug 64. The operator then drives an automobile over the inclined ramps to an elevated parking location as illustrated by the phantom line position of automobile 124 in FIG. 1. The operator then leaves the automobile, walks rearwardly along catwalk 126 and down the upper ramp. As he passes the left-hand support post, as viewed in FIGS. 2—5 (the right-hand post as viewed in FIG. 1), the upper end of handle 78 is pushed rearwardly to release locking bar 54 in the manner previously explained. As the operator continues to walk down the lower ramp, his weight is sufficient to overcome the slight additional counterbalancing bias applied by the upper ramp and the ramps start to move toward the open position. The locking bar is retained in the rightmost, or unlocked, position until the lower ramp passes below the lower end of handle 78, as previously explained, after which time spring 66 restores the bar to its original solid line position of FIG. 4. Once the ramps start to move toward the open position, the inertia of the opening movement normally makes it unnecessary for the operator to remain on the lower ramp for a longer period of time than that required to walk down the ramp to the lower level. When the lower ramp reaches the position of FIG. 7, locking plate 98 is cammed rearwardly and then locks beneath lugs 100. The ramps are now in the open position illustrated by the ramps of unit 12 in FIG. 1 and the upper and lower ramps overlie and underlie, respectively, the automotive path of movement whose lateral limits are defined by legs 38 and posts 40. After driving a car over the lower ramp 24 to a parking position directly beneath a car previously driven to the upper level, a third car may then be parked on the lower level between posts 40 with its rear wheels resting on the lower ramp. When it is desired to remove the upper automobile, the automobile parked on the lower ramp 24 is moved, foot pedal 118 is depressed, the ramps automatically revert to their inclined, locked position and the operator then walks up the ramp assembly and drives the car down.

Inasmuch as support posts 40 present some collision hazard to an automobile, this hazard may be diminished by effectively removing the posts when a car is being driven up the inclined ramps. The manner in which this is achieved is readily apparent from an inspection of FIGS. 9 and 10 which diagrammatically illustrate a second embodiment of the invention. In these Figures rigid levers 210 have been substituted for the cables 42 illustrated in FIG. 1. Levers 210 are fulcrummed on the upper ends of posts 212 whose height is approximately half that of posts 40 in FIG. 1. The outer ends of levers 210 carry bearing members, such as rollers or the like, that are captively engaged with elongated slots or slides 214 formed adjacent the sides of upper and lower ramps 216, 218. It will be apparent that the bearing members at the opposite ends of levers 210 undergo relative movement between the ends of slots 214 as the ramps move between the positions shown in FIGS. 9 and 10. The manner in which the ramps 216, 218 are retained in their inclined and open position is the same as that previously described in connection with the embodiment of FIGS. 1—8. It will be apparent that, in the embodiment shown in FIGS. 9 and 10, the counterbalancing forces are transmitted through levers 210.

FIGS. 11 and 12 depict a further embodiment of the invention wherein gears 310 journaled on bearings carried by posts 312, transmit the counterbalancing forces between ramps 314, 316 via curved racks 318, 320 carried by the respective ramps. The embodiment shown in FIGS. 11 and 12 is particularly desirable where a small prime mover is to be used to position the ramps. In such case, the prime mover could be secured to one of the posts 312 and have an irreversible driving connection, such as by a worm drive, with one of the gears thus rendering it unnecessary to lock the ramps in the open position.

FIG. 13 illustrates the manner in which the lengths of ramps 410, 412 may be decreased while positioning upper level 414 at a distance above the lower level which substantially exceeds the height of an automobile. In this case, a fixed incline 416, secured to upper level 414, provides the upper pivot support 418 for upper ramp 410 at the lower end of incline 416. The manner in which ramps 410 and 412 are counterbalanced is the same as that described in connection with FIGS. 1—8.

I claim:

1. Automotive support structure extending upwardly from a lower parking level and supporting an upper parking level in vertical spaced relation thereto; lower and upper ramp means associated with said structure; and mounting means supporting said lower and upper ramp means adjacent said lower and upper levels, respectively, for counterrotative movement between a first position defining at least a portion of an inclined path of automotive wheel travel between said levels and a second position respectively underlying and overlying said portion of said path; said mounting means comprising a support adjacent the juncture of said lower and upper ramp means and means, carried by said support, interconnecting said lower and upper ramp means for constraining movement of said ramp means between said positions and for counterbalancing one ramp means against the other into said first position, the improvement comprising lock means, independent of said constraining means, operative between the lower ramp means and the support for holding the lower ramp means in automobile-supporting relation in the inclined path;

means, independent of said constraining means, operative between the upper ramp means and the support for holding the upper ramp means in automobile-supporting relation in the inclined path; and means manually operable form a location on said lower ramp means to release said lock means to enable the weight of an operator to overcome the counterbalance and move said ramps into said second position.

2. The support structure of claim 1 wherein said lock means comprises stationary cam means, movable cam means operative against the stationary cam means to retract said lock means upon upward movement of said lower ramp means, and means biasing said lock means into load-supporting engagement.

3. The support structure of claim 1 wherein said upper ramp means holding means comprises a load supporting arm on said upper ramp extending laterally thereof and a shoulder on said support for supportably engaging said arm when said upper ramp is in the first position.

4. The support structure of claim 1 wherein said mounting means support said ramp means for relative pivotal movement.

5. The support structure of claim 1 wherein said last named means includes flexible force-transmitting means.

6. The support structure of claim 1 wherein said last named means includes lever means connected adjacent opposite ends to said lower and upper ramp means.

7. The support structure of claim 1 wherein said last named means includes elongate gear means on said lower and upper ramp means and gear means on said support meshing with said elongate gear means.

UNITED STATES PATENT OFFICE
CERTIFICATE OF CORRECTION

Patent No. 3,599,382         Dated August 17, 1971

Inventor(s) Wayne B. Stone, Jr.

It is certified that error appears in the above-identified patent and that said Letters Patent are hereby corrected as shown below:

Col. 1, line 9:  Change "where it necessary" to --where it is necessary--.

Col. 1, line 20:  Change "application," to --applications,--.

Col. 1, line 21:  Change "Nos." to --No.--.

Col. 2, line 70:  Change "extreme position" to --extreme open position--.

Col. 4, line 67:  Change "read" to --rear--.

Col. 6, line 66:  Change "form" to --from--.

Signed and sealed this 14th day of March 1972.

(SEAL)
Attest:

EDWARD M. FLETCHER, JR.
Attesting Officer

ROBERT GOTTSCHALK
Commissioner of Patents